US012571924B2

(12) United States Patent
Pettersen

(10) Patent No.: US 12,571,924 B2
(45) Date of Patent: Mar. 10, 2026

(54) RADON MONITORING

(71) Applicant: Airthings ASA, Oslo (NO)

(72) Inventor: Dag Mattis Pettersen, Oslo (NO)

(73) Assignee: Airthings ASA, Oslo (NO)

( * ) Notice: Subject to any disclaimer, the term of this patent is extended or adjusted under 35 U.S.C. 154(b) by 196 days.

(21) Appl. No.: 18/289,212

(22) PCT Filed: May 5, 2022

(86) PCT No.: PCT/EP2022/062218
§ 371 (c)(1),
(2) Date: Nov. 1, 2023

(87) PCT Pub. No.: WO2022/234048
PCT Pub. Date: Nov. 10, 2022

(65) Prior Publication Data
US 2024/0219586 A1      Jul. 4, 2024

(30) Foreign Application Priority Data
May 5, 2021     (GB) ..................................... 2106405

(51) Int. Cl.
*G01T 1/178*          (2006.01)

(52) U.S. Cl.
CPC .................................... *G01T 1/178* (2013.01)

(58) Field of Classification Search
CPC ..................................................... G01T 1/178
See application file for complete search history.

(56) References Cited

U.S. PATENT DOCUMENTS 3,767,915 A * 10/1973 Battist ....................... G01T 7/02
250/369
4,064,436 A * 12/1977 Ward, III ................ G01T 1/178
250/DIG. 2
(Continued)

FOREIGN PATENT DOCUMENTS

KR      1020160024076 A      3/2016
KR      1020170077694 A      7/2017
(Continued)

OTHER PUBLICATIONS

International Search Report and Written Opinion for PCT/EP2022/062218, mailed Sep. 5, 2022, 15 pages.
(Continued)

*Primary Examiner* — David J Makiya
*Assistant Examiner* — Fani Polyzos Boosalis
(74) *Attorney, Agent, or Firm* — Klarquist Sparkman, LLP

(57) ABSTRACT

A method of monitoring radon in an area, comprising: acquiring a series of radon measurements for the area; obtaining a characteristic value relating to ventilation in the area; and calculating a weighted average from the series of radon measurements. Using a characteristic of the ventilation to calculate the weights allows some knowledge of the ventilation rate to be used in the averaging process so as to improve the quality of the averaged data. With a high ventilation rate, the radon level drops rapidly, with the removal of radon by ventilation dominating any radon source, and so an average can be more strongly weighted towards the current value. With a low ventilation rate, the removal of radon slows and so the noise in the data is taken into account. Combining the actual radon measurements with knowledge of the ventilation rate allows the averaging function to provide better time resolution.

19 Claims, 11 Drawing Sheets

710  Acquire series of radon measurements for an area

720  Interpolate radon measurement data

730  Acquire data from CO2, VOC, Temperature and/or humidity sensor

740  Obtain multiple characteristic values relating to ventilation in the area from sensor data 750  Calculate weighted average from series of radon measurements using each characteristic value 760  Time shift weighted averages according to characteristic value 770  Merge time-shifted weighted averages according to characteristic value

(56)                References Cited

U.S. PATENT DOCUMENTS

| | | | |
|---|---|---|---|
| 4,920,263 | A | 4/1990 | Fimian et al. |
| 2020/0378938 | A1 | 12/2020 | Lee |

FOREIGN PATENT DOCUMENTS

| | | | | |
|---|---|---|---|---|
| KR | 20170090728 | A | * | 8/2017 | ............ G06Q 50/26 |
| KR | 1020170090728 | A | | 8/2017 | |
| KR | 101 837 746 | B1 | | 3/2018 | |
| KR | 1020200064957 | A | | 6/2020 | |
| KR | 20210017955 | A | * | 2/2021 | ............ G01T 1/161 |
| WO | WO 2016/005761 | A2 | | 1/2016 | |

OTHER PUBLICATIONS

IPO Search Report under Section 17(5) for GB2106405.0, dated Nov. 5, 2021, 3 pages.

\* cited by examiner

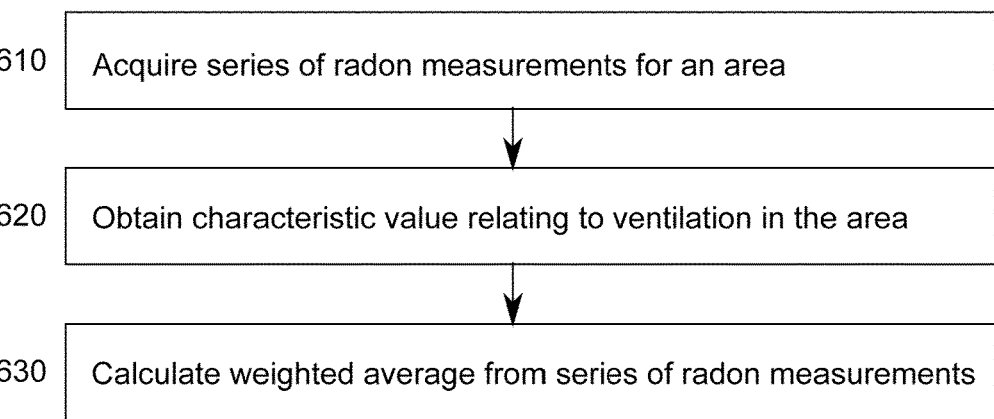

| 610 | Acquire series of radon measurements for an area |
| 620 | Obtain characteristic value relating to ventilation in the area |
| 630 | Calculate weighted average from series of radon measurements |

FIG. 6

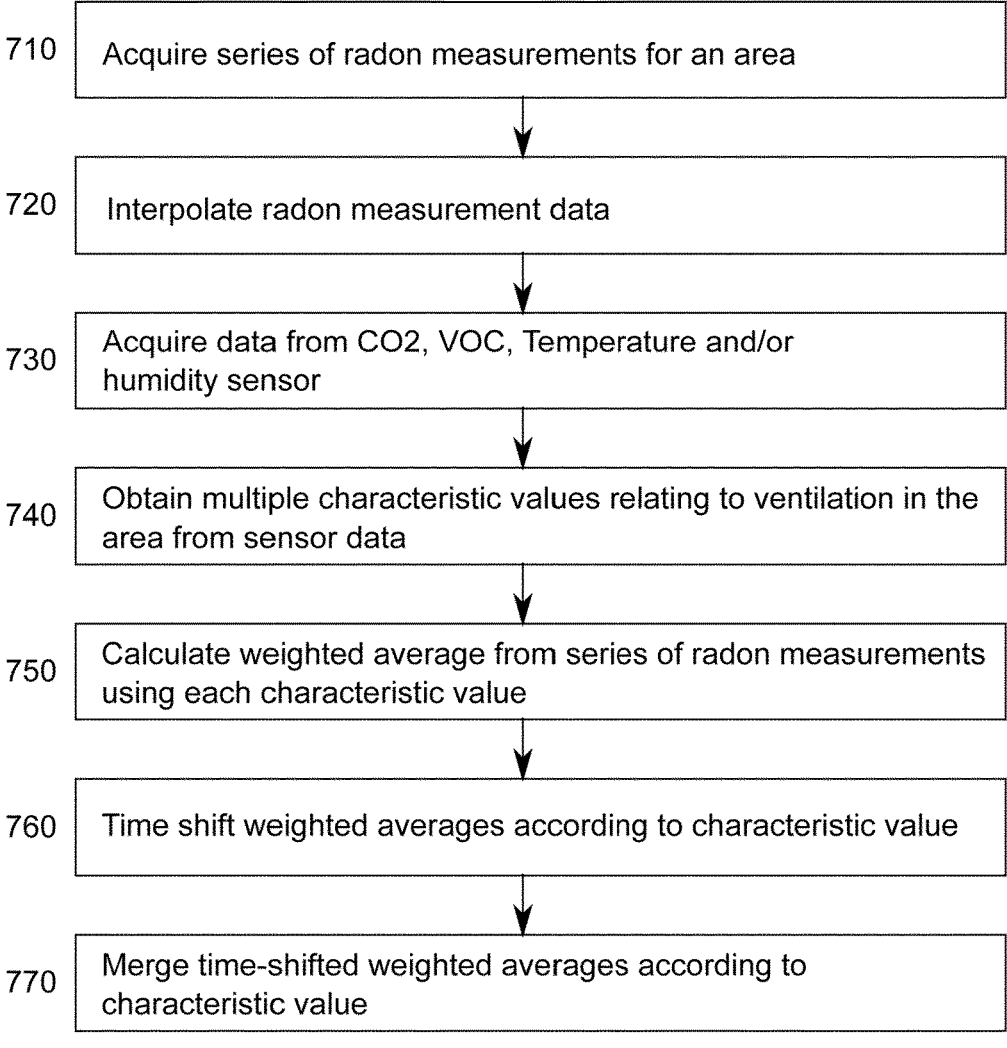

| 710 | Acquire series of radon measurements for an area |
| 720 | Interpolate radon measurement data |
| 730 | Acquire data from CO2, VOC, Temperature and/or humidity sensor |
| 740 | Obtain multiple characteristic values relating to ventilation in the area from sensor data |
| 750 | Calculate weighted average from series of radon measurements using each characteristic value |
| 760 | Time shift weighted averages according to characteristic value |
| 770 | Merge time-shifted weighted averages according to characteristic value |

FIG. 7

RADON MONITORING

CROSS REFERENCE TO RELATED APPLICATIONS

This is the U.S. National Stage of International Application No. PCT/EP2022/062218, filed May 5, 2022, which was published in English under PCT Article 21(2), which in turn claims the benefit of Great Britain Application No. 2106405.0, filed May 5, 2021.

The present invention relates to radon gas detection and monitoring.

Radon is a radioactive element which at normal temperature and pressure is a gas. It is colourless, odourless and tasteless which means that its presence and concentration is not readily detectable by human beings. However, due to its radioactivity, it can be harmful if the concentration is too high. At normal concentrations, radiation from radon typically accounts for around half of a person's annual natural radiation dose.

The most stable isotope of radon is radon-222 which has a half life of 3.8 days and is produced as part of the decay chain of uranium-238 which is present throughout the Earth's crust. Being a noble gas, radon readily diffuses out of the ground and into the air around us. The daughter products of radon decay tend to be charged particles which will readily stick to dust or smoke particles in the air. When these particles are inhaled, they can lodge in the lungs and the subsequent radiation from decay of the radon daughter products causes a risk of lung cancer. Consequently, higher concentrations of radon lead to higher risks of cancer.

The concentration of radon in the atmosphere depends, amongst other things, on ventilation. Areas with good ventilation will have lower radon concentrations, whereas a lack of ventilation leads to radon accumulation and thus increases the radiation level in such areas. Radon levels outside therefore tend to be lower than inside buildings. For example, typical radiation doses from radon may be around 10-20 Bq/m³ outside and may be around 100 Bq/m³ inside. Radon levels can also vary significantly due to variations in geographic location (e.g. different geologies), or due to differences in building materials.

Radon decays by emission of an alpha particle with an energy of 5.5 MeV. The resultant Polonium-218 has a half life of about 3 minutes before emitting an alpha particle of 6.0 MeV. The resultant Lead-214 has a half life of around 27 minutes before beta-decaying to Bismuth-214 which in turn has a half life of 20 minutes and beta-decays to Polonium-214. Polonium-214 has a half life of about 164 microseconds before emitting an alpha particle of 7.7 MeV resulting in Lead-210 which has a half life of 22 years and is thus relatively stable.

Detection of radon to date has been divided into two main methods. The first method is active detection of alpha particles using a photodiode and the second method is passive detection of alpha particles using a track detector. Typically the first method requires a large instrument and needs electrical power to be supplied. Such instruments have typically only been used for larger scale, e.g. commercial or industrial measurements as the instruments are more bulky and expensive. The photodiode (e.g. a PIN diode) is placed in a diffusion chamber of the device. Alpha particles hitting the photodiode create a number of electron-hole pairs which will cause a small current to be generated. These current signals can be detected and counted to provide a measure of the radon concentration within the diffusion chamber. Such active measurements can be provided continuously in time rather than having to wait for the results of a laboratory analysis.

The second method uses much smaller detectors with no power requirement and is thus much more suited to domestic customers. A passive (i.e. unpowered) track chamber is typically placed in a selected location and left for a predetermined period of time (typically from a few weeks and up to about 3 months) after which it is sent back to a lab for analysis. Alpha particles emitted within the chamber leave tracks on a film which is also disposed within the chamber. These tracks can be detected in the lab and counted thus providing a measure of the radon concentration in the air within the chamber.

A typical process for analyzing radon levels in a public building is to deploy passive detectors initially and if those detectors indicate radon levels above a certain threshold then more detailed measurements are made with an active detector that can monitor how the radon level varies throughout a day and/or from day to day (e.g. working days versus weekend days). Variations in radon level typically occur due to changes in ventilation, e.g. when active air circulation is turned off to save power at the end of a working day and/or for the weekend. The more detailed measurements are often quite time limited due to the expense and inconvenience of getting a professional radon monitoring company in with an accurate active radon monitor. Accurate radon instruments are expensive and are often bulky as well as drawing significant power (requiring either a large battery or a mains connection). However, often the absolute value of the active detector is not important so much as the changes in measurement throughout the measurement period in question. For example, the active detector can provide a ratio of radon measurements between two time periods (e.g. working time versus non-working time). That ratio can then be applied to the original data gathered from passive track detectors to provide an estimate of the (for example) working time and non-working time concentrations during the initial period.

While the use of accurate and expensive professional radon monitors can provide data on variations throughout a day, these equipment and services are too expensive to be used for extended periods of time and therefore they do not allow for changes in radon levels over time to be tracked easily. For example radon levels can change due to seasonal or weather variations, e.g. changes in temperature, wind strength and direction, humidity levels, etc. Also, changes in use within a building can affect the radon levels, e.g. by changing ventilation patterns (a room in more active use can experience higher ventilation due to more opening of windows and doors or switching on of fans. Higher ventilation tends to reduce radon levels. To monitor such changes in radon levels it is necessary to detect radon continuously over time, i.e. to have a permanent radon detector in place throughout the year. However, for such radon detectors to be cost effective as well as discrete and attractive for continuous installation, they need to be smaller and to draw less power than professional equipment. The smaller size tends to mean a smaller diffusion chamber which in turn reduces the short term accuracy of the data as number of counts per unit time within the diffusion chamber decreases. For example, with a diffusion chamber of around 50 cubic centimetres, at normal healthy radon levels, it is not unusual to detect zero disintegrations in an hour. For this reason, continuous monitoring of radon from small detectors tends to be provided on a timescale of about a day. For example, a 24 hour rolling average may be provided with reasonable accuracy, which will allow for detection of seasonal variations, but is not accurate enough to detect short timescale variations within a day.

Radon levels can vary significantly within a day due to the ventilation changes that occur during a day. Ventilation is expensive to run. As well as requiring electricity to run the fans, the exchange of air also represents a significant heat loss when the building is at a higher temperature than the outside as the replacement cold air from outside must be heated up to the indoors temperature. It is therefore desirable to operate ventilation in a building only when necessary, e.g. only when people are within the building. At night and at the weekend when a building is empty, the presence of radon is not a problem and does not justify the expense of running the ventilation. Instead, the ventilation can be switched on sufficiently far in advance of the building's expected use that the radon levels will have dropped to acceptable levels by the time people arrive to use the building. Similarly, ventilation can be switched off at the end of the day to save energy. However, with the resolution of the data available from continuous detectors as discussed above, the exact timing effect of these changes is difficult to identify in the data. For example a 24 hour rolling average will always include a full daytime period and a full night time period encompassing a full daily ventilation cycle. Therefore the timing of the effect that the changes in ventilation have on the radon level is not well known.

According to one aspect of the invention, there is provided a method of monitoring radon in an area, comprising:

acquiring a series of radon measurements for the area;

obtaining a characteristic value relating to ventilation in the area; and calculating a weighted average from the series of radon measurements;

wherein weights for the weighted average are calculated based on the characteristic value.

Calculating a weighted average of the radon data allows smoothing of the data to remove some of the noise from the radon sampling process, while weighting the data so as to emphasize certain portions of the data. Importantly, using a characteristic of the ventilation in the area to calculate the weights allows some knowledge of the ventilation rate to be used in the averaging process so as to improve the quality of the averaged data. This is because the ventilation rate itself affects the data and the noise level. For example, with a high ventilation rate, the radon level can be expected to drop rapidly, with the removal of radon by ventilation dominating any radon source, and so an average can be more strongly weighted towards the current value (higher weights for recent data) while disregarding (lower weights) past data. By contrast, with a low ventilation rate, the removal of radon will be slower and so the noise in the data needs to be taken into account, so more data should be highly weighted in the average. Accordingly, combining the actual radon measurements with some knowledge of the ventilation rate allows the averaging function to provide better time resolution where appropriate without giving misleading results in other situations.

The choice of which data to weight highly and which data to weight lower can be done in many different ways. For example, it could be desirable in some circumstances to weight older data more strongly than recent data, e.g. where a period of high measurement noise is detected or predicted. However, in most situations, for improving the time information that can be extracted from the data, it is desirable to emphasize the more recent data. Therefore in some embodiments the weights are higher for more recent measurements in the series. This ensures that changes in the data have an immediate impact on the average, thereby emphasizing current time in the data. The way that the weights are distributed can also be chosen in a number of different ways. For example a step function could be used to emphasize several recent measurements equally at a first weight, then the remaining older measurements at a second lower weight. However, it is preferred that a sliding weighting scale be used so that the weights decrease the further back in time they go such that measurements are de-weighted more the older they get. To put this another way, each weight is smaller than all weights that are more recent than it.

The characteristic value may be any value that characterises the ventilation. For example it could be a ventilation rate itself, or a speed of a fan. However, in some embodiments the characteristic value is a time constant for the change in radon concentration due to ventilation. The time constant is a numerical measure of how the radon concentration changes over time and will depend on the way in which radon is removed from the environment. However, in most cases, e.g. where the radon concentration changes entirely, or predominantly due to ventilation, the radon concentration will follow an exponential curve, i.e. when the ventilation is running, the radon concentration will decay in an exponential manner. In such cases the time constant is the time constant of an exponential decay curve, i.e. the time required for the concentration to decrease be a factor of $1/e$.

The weights may form an exponential curve with time constant based on the characteristic value. In this way, the weights for each measurement decrease exponentially as they progress further back in time so that older measurements are weighted less and less until they make a negligible contribution. The time constant determines the profile of that exponential curve and therefore effectively determines how many measurements make a substantial contribution. A low time constant means that the weights fall off (reduce towards zero) rapidly so that only a few recent measurements contribute to the weighted average. On the other hand, a high time constant means that the weights fall off (reduce to zero) slowly so that many measurements will contribute to the weighted average. Thus when the ventilation is strong (low time constant), only recent measurements are taken into account, while when the ventilation is weak (or off), the weighted average will take into account measurements over a longer time period (although still weighted more toward more recent measurements). In some embodiments there may be a fixed or a maximum number of weights that are used, i.e. limiting the time period that the exponential curve covers. In such cases, with a high time constant, the oldest weights in that time period may be non-negligible.

The weights could be determined based just on an arbitrary time series, i.e. with each weight being lower than the last by a fixed fraction. However, in some cases the measurements may not be equally or regularly spaced in time and therefore in some embodiments the weight for a given measurement may be determined based on the exponential decay curve, the time constant and the time that has elapsed since the given measurement.

The weighted average could take into account all available measurements, or all measurements that have ever been taken. However, older measurements cease to be relevant after a while and so in some embodiments the series of radon measurements is a moving window of measurements over time. The moving window means that every time a new measurement is acquired, it is taken into account in the weighted average, but an older measurement that was previously taken into account is now dropped from the weighted average. The length of the window (i.e. the number of measurements to be taken into account) can be chosen appropriately for the particular scenario. However, in some embodiments the window may cover a period of at least 12 hours, or at least 24 hours or at least 36 hours. It may be noted that when the moving window and the reducing weights are both taken together there are two factors that determine the contribution that a given measurement has on the weighted average. Firstly, if it is outside the moving window then it makes no contribution at all. Secondly, if it is inside the moving window then its contribution is determined by the shape of the weighting function (e.g. by the exponential curve and time constant).

In some embodiments it may be desirable to change the size of the moving window so as to change the number of data points that are taken into account in the weighted average. For example this may be suitable where a change occurs in the system such that previous data points become invalid or irrelevant as they no longer relate to the current scenario. In such cases the size of the moving window can be reduced to exclude older measurements. It will be appreciated that the size of the moving window may be effectively reduced by removing (or setting to zero) older points within the window.

The characteristic value may be fixed for a given scenario, or may be changed or reset at various intervals or upon request or upon certain triggers. However, one particular advantage of the system is in adapting to changes in the environment and therefore in some embodiments when a new radon measurement is acquired, a new characteristic value relating to ventilation is acquired and the weights are updated based on the new characteristic value. In this way, the weights for previous measurements are not always the same in each weighted average calculation. An updated characteristic value can change the weights so that more or fewer historic measurements make significant contributions. For example when a fan is switched on, the ventilation rate will suddenly increase. This can cause a significant change in the characteristic value (e.g. the time constant for radon concentration drops) such that it is suddenly better to weight the average based on only a few recent measurements rather than on a longer stream of measurements. Therefore it is preferred to fetch a new characteristic value, e.g. a new time constant with every measurement so that the characteristic value changes over time and affects the weighting of the weighted average over time.

Thus, in some preferred embodiments the weighted average is an exponentially weighted moving average. In particularly preferred embodiments, the weighted average is an exponentially weighted moving average with the exponential having time-varying time constant.

The characteristic value may be obtained in various ways and/or from various different sources. For example it may be obtained from known information about ventilation equipment (e.g. a fan may be known to provide a certain ventilation rate, e.g. a number of litres of air per minute, or the fan may be known to have certain known rates associated with certain settings or levels). Alternatively, the characteristic value may be obtained based on measurements of the ventilation, e.g. empirical measurements of the ventilation rate with and without a fan running. In other example, the characteristic value may be determined based on history or a predetermined schedule of known ventilation rates for a given room or area. However, in some embodiments it is desirable to obtain information about the ventilation in the area from other sources that can provide reliable indicators or measurements. Thus in some embodiments the characteristic value relating to ventilation in the area is obtained from measurements of an air quality characteristic, such as at least one of: carbon dioxide, volatile organic compounds and humidity in the area. These are all characteristics of the area that are dependent on ventilation. For example strong ventilation will reduce the presence of carbon dioxide, VOCs and humidity in much the same way as it reduces the presence of radon in the area. Advantageously, measurements of carbon dioxide, VOCs and/or humidity can be acquired more regularly and can have much lower noise due to the sensitivity of the sensors and the rate at which measurements can be taken. For example, radon measurements suffer from noise due to the low number of radon disintegrations per hour such that a small sensor simply cannot provide high time-resolution data. However, the $CO_2$ concentration in an area can be measured accurately and varies rapidly with time (e.g. with the presence of people in the room) and can therefore be measured more frequently with lower noise. The same ventilation rate applies to all of these characteristics and therefore the characteristic value of any one of these can be used to characterise the radon concentration. Therefore acquiring the characteristic value for ventilation based on one or more of these air quality characteristics and using it in the calculation of the weighted average for radon means that the ventilation in the area can be characterized more accurately than it could based on radon alone, but that information can then be used to determine the weighting of the weighted average for radon.

As noted above, the characteristic value for ventilation may be obtained or measured in real time and applied directly to the radon data. However, in other examples the characteristic value relating to ventilation in the area may be obtained from a lookup table based on the current time. The ventilation in many areas follows a very standard pattern, e.g. as determined by building controls. For example this may be the case where ventilation is programmed to operate during office hours but is switched off outside office hours. In such cases, the characteristic value can simply be looked up at any given point in time. In some examples the lookup table may be determined from repeated measurements over time so as to calculate accurate values over time for a given area. These measurements may be acquired from $CO_2$, VOC, humidity or radon measurements over time (and many measurements may be averaged for each time point in the lookup table). Combinations of these measurements may of course also be used to increase the amount of data available and to build up a more accurate profile of ventilation over time.

In some examples the method may comprise increasing the time resolution of the series of radon measurement values by interpolating to calculate interpolated measurements between actual measurements. Radon measurements, especially from small sensors are generally spaced apart in time by a significant period as it is not statistically sensible to provide them more frequently. For example, for a radon sensor with a small diffusion chamber (e.g. of around 50 cubic centimetres), measurements may be provided once per hour. Interpolating between these measurements provides a higher time resolution data series that can then be used in the weighted average. The interpolated measurements will then be weighted more strongly towards the more recent measurement. The presence of the interpolated measurements changes the average by skewing the average according to the interpolation. It also allows finer time-resolution changes in ventilation to be taken into account as such changes may be available on a time scale shorter than that of the radon measurements (e.g. measurements every 5 minutes or every minute rather than every hour). It has been found that this provides a more useful indication of the radon concentration.

There are numerous methods of interpolation that could be used to generate the interpolated measurements, such as cubic spline interpolation. However, in some embodiments the interpolating is linear interpolating between adjacent measurements. It has been found that a linear interpolation is effective and provides a good result while being simple and efficient to calculate.

In some embodiments the step of obtaining a characteristic value may comprise: obtaining a first characteristic value relating to a first ventilation in the area; and obtaining a second characteristic value relating to a second ventilation in the area; and wherein the step of calculating a weighted average comprises: calculating a first weighted average from the series of radon measurements, where the weights for the first weighted average are calculated based on the first characteristic value; and calculating a second weighted average from the series of radon measurements, where the weights for the second weighted average are calculated based on the second characteristic value. The first and second characteristic values may correspond to two different ventilation rates that may be found in the area. For example the first characteristic value may be a day-time, or typical high ventilation rate. The second characteristic value may be a night-time, or typical low ventilation rate. By doing the calculations twice, once for each characteristic value, the weighted average can be obtained over time for both possible scenarios. Data from the appropriate scenario can then be extracted in a later step once the most appropriate scenario has been determined. It will be appreciated that more than two (indeed any number) of scenarios and characteristic values can be calculated in this way in parallel.

In some embodiments the method further comprises forming a combined time series of radon values comprising a plurality of time points and a corresponding plurality of radon values, wherein the radon values for a first set of time points are calculated from the first weighted average and a second set of time points are calculated from the second weighted average. In this way the two (or more) sets of radon values can be merged into a single series by taking the most appropriate values for any given time period. The boundaries between different segments may be chosen for any suitable reason. However, in some embodiments they may correspond to environmental changes which may have an influence on the radon concentration. For example, in some embodiments changes in ventilation will affect the radon concentration and therefore a change in the ventilation rate may mark a boundary at which to switch from using the first weighted average to using the second weighted average.

Accordingly, the first set of time points may correspond to times when the ventilation in the area had the first characteristic value and the second set of time points may correspond to times when the ventilation in the area had the second characteristic value. One reason that this may be important is that when the ventilation is on (or high), the radon level will almost certainly be decreasing exponentially towards a minimum value (typically the outdoor radon concentration as replacement air is normally sourced from outdoors), but when the ventilation is off (or low), the radon level may be increasing exponentially towards a maximum value (typically based on the rate of supply of radon balanced against the low ventilation rate (which may just be air leakage from the building).

The first set of time points and the second set of time points may be determined by applying a low pass filter to the radon measurements to determine times at which the radon level was rising and times at which the radon level was falling; and the method may comprise determining the first set of time points as the time points at which the radon level was rising and the second set of time points as the time points at which the radon level was falling. Thus the radon data itself may be used to determine whether to use the data corresponding to the first characteristic value or the data corresponding to the second characteristic value and the corresponding first weighted average or second weighted average. In this way, a combined set of data can be produced which is appropriately averaged according to whether the radon level was rising (e.g. low ventilation) or falling (e.g. high ventilation). Any suitable method may be used to determine whether the radon level is rising or falling. For example a certain number of consecutive increases or decreases may be used. In some embodiments a slow low pass filter may be used to filter out high frequency noise variations and determine whether the general trend is upwards or downwards.

It will be appreciated that the area being monitored may be any area, e.g. an area within a building such as a hallway or lobby. However, in preferred embodiments the area is a room. Rooms are the areas where people tend to spend extended periods of time, e.g. office rooms or meeting rooms and therefore tend to be the most important areas for monitoring and determining the risk level posed to occupants of the room.

According to another aspect, the invention provides a radon measurement system comprising:

a radon detector arranged to acquire a time series of radon measurements; and a processor arranged to:

obtain a characteristic value relating to ventilation in the area in which the radon detector is located; and calculate a weighted average from the series of radon measurements;

wherein weights for the weighted average are calculated based on the characteristic value.

All of the preferred and optional features discussed above may also be applied to the radon measurement system. For example the processor may be arranged to carry out any of the methods discussed above (or any combination of them).

It will be appreciated that the radon detector is preferably an active radon sensor, providing regular outputs (e.g. digital outputs) of radon value. The radon value may be in any form such as a number of counts in a given time period or since the last measurement, or a radon concentration determined from the detected counts.

The radon measurement system may further comprise a sensor arranged to measure an air quality characteristic over time; and the radon measurement system may be arranged to determine the characteristic value from the measured air quality characteristic. As discussed above, suitable sensors may include one or more of a $CO_2$ sensor, a VOC sensor, a humidity sensor, and a temperature sensor.

Preferred embodiments of the invention will now be described, by way of example only, and with reference to the accompanying drawings in which:

FIG. 6 illustrates a method of monitoring radon; and

FIG. 7 illustrates another method of monitoring radon.

Figure 1:
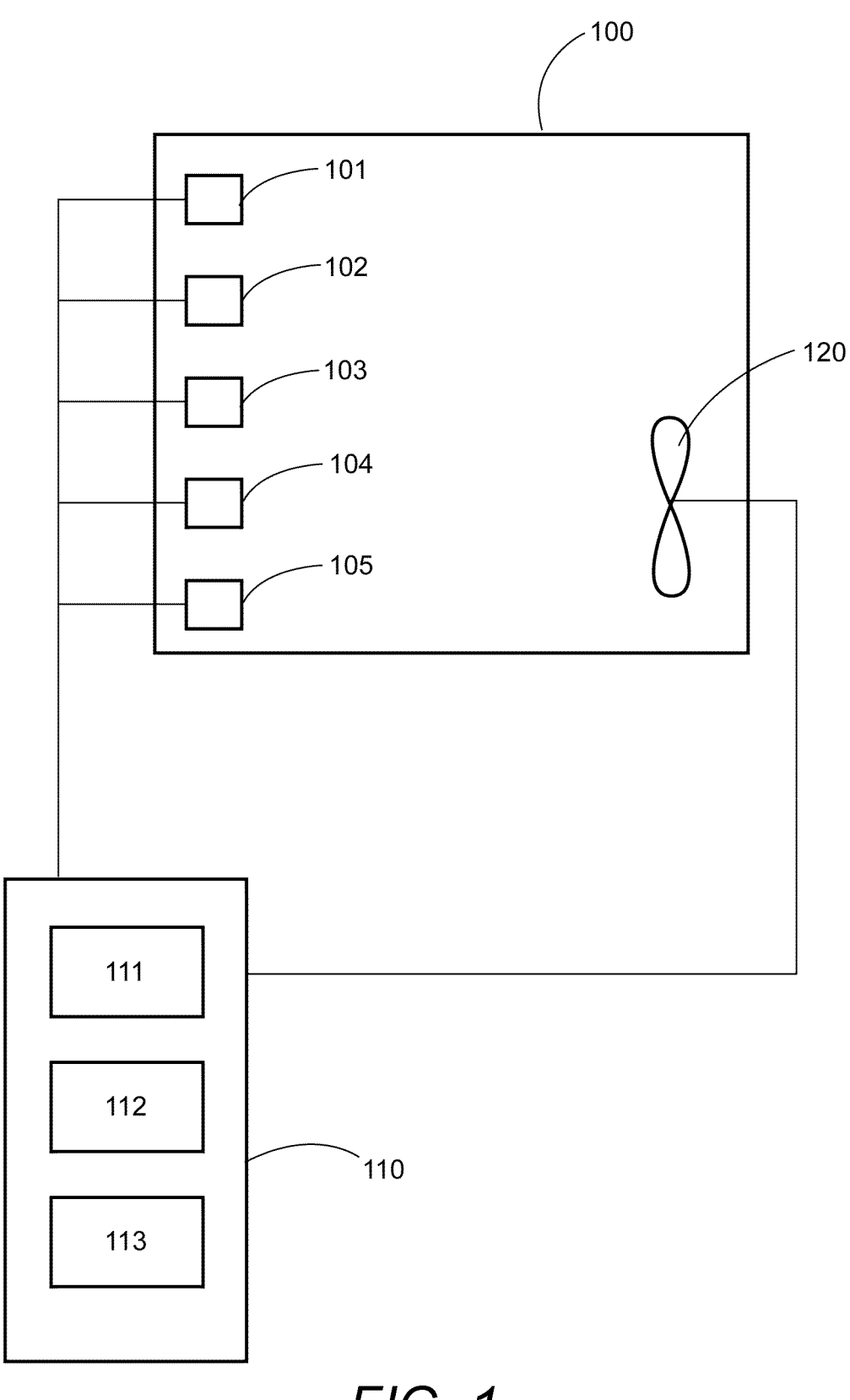
FIG. 1 shows a schematic diagram of a system for monitoring radon.

FIG. 1 schematically shows a room 100 in which a number of sensors are provided. The sensors in this example include a radon sensor 101, a carbon dioxide sensor 102, a volatile organic compounds sensor 103, a temperature sensor 104 and a humidity sensor 105. The sensors 101-105 all provide their outputs to a computer 110 which includes a processor 111, a memory 112 and a storage device 113. It will be appreciated that the computer 110 may be any suitable computing device such as a desktop, laptop, tablet or mobile telephone or the like. The computing device may be situated locally, e.g. within the same building as the room 100 or it may be located off site and connected by a network (e.g. a LAN, WAN or the internet). The computer 110 may be implemented in the cloud. It will also be appreciated that the sensors 101-105 may provide their data to the computer 110 by any suitable means, e.g. by a wired link, or wirelessly by means of various protocols such as WiFi, Bluetooth, Zigbee, etc. The room 100 also has a fan 120 which facilitates air exchange in the room. It will be appreciated that the fan 120 may be an extractor fan that draws air out of the room or it may be a positive pressure ventilation fan that supplies air into the room. Both types of fan may be used for a balanced pressure system.

Figure 2A:
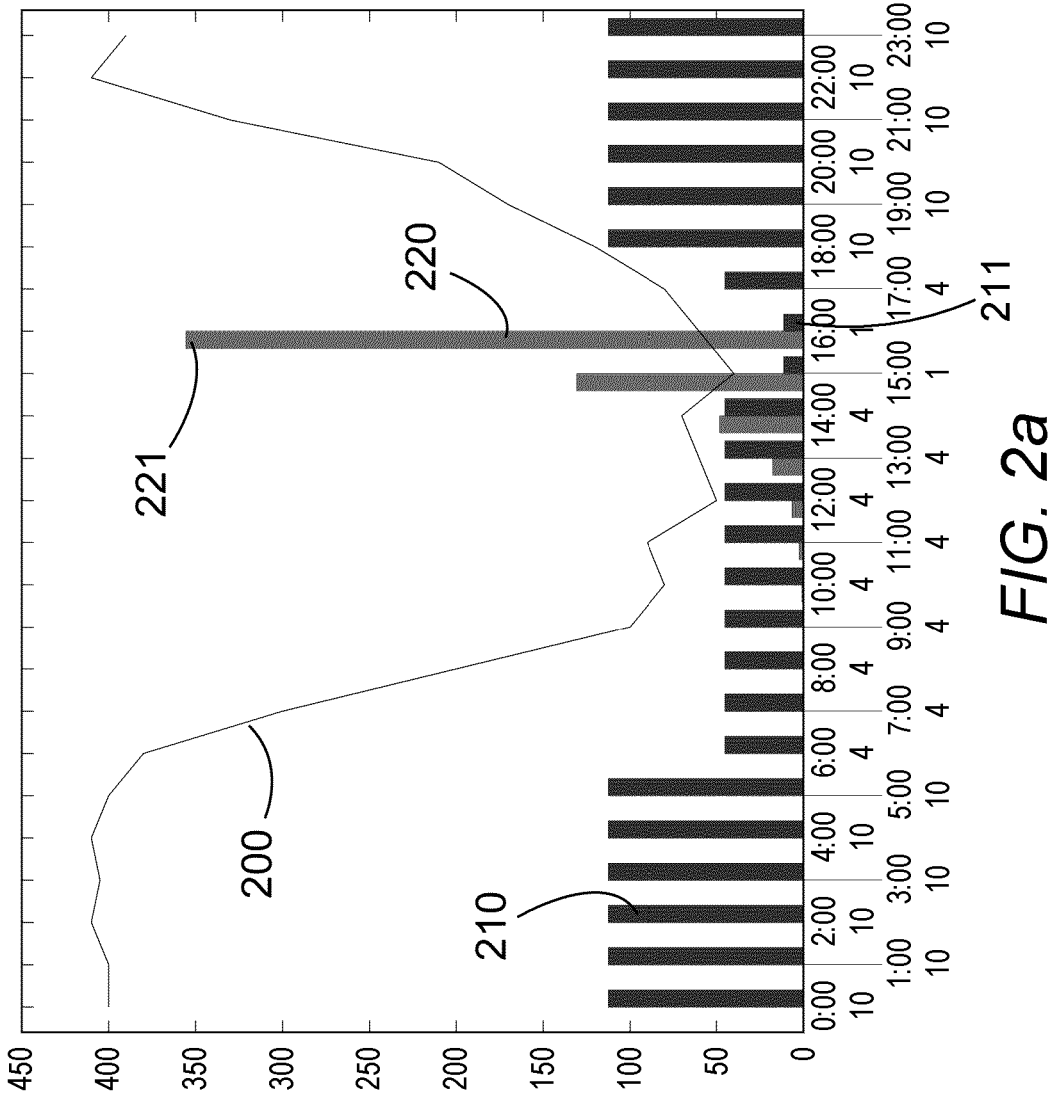
FIGS. 2a-2c show examples of different weighted averages.
Figure 2B:
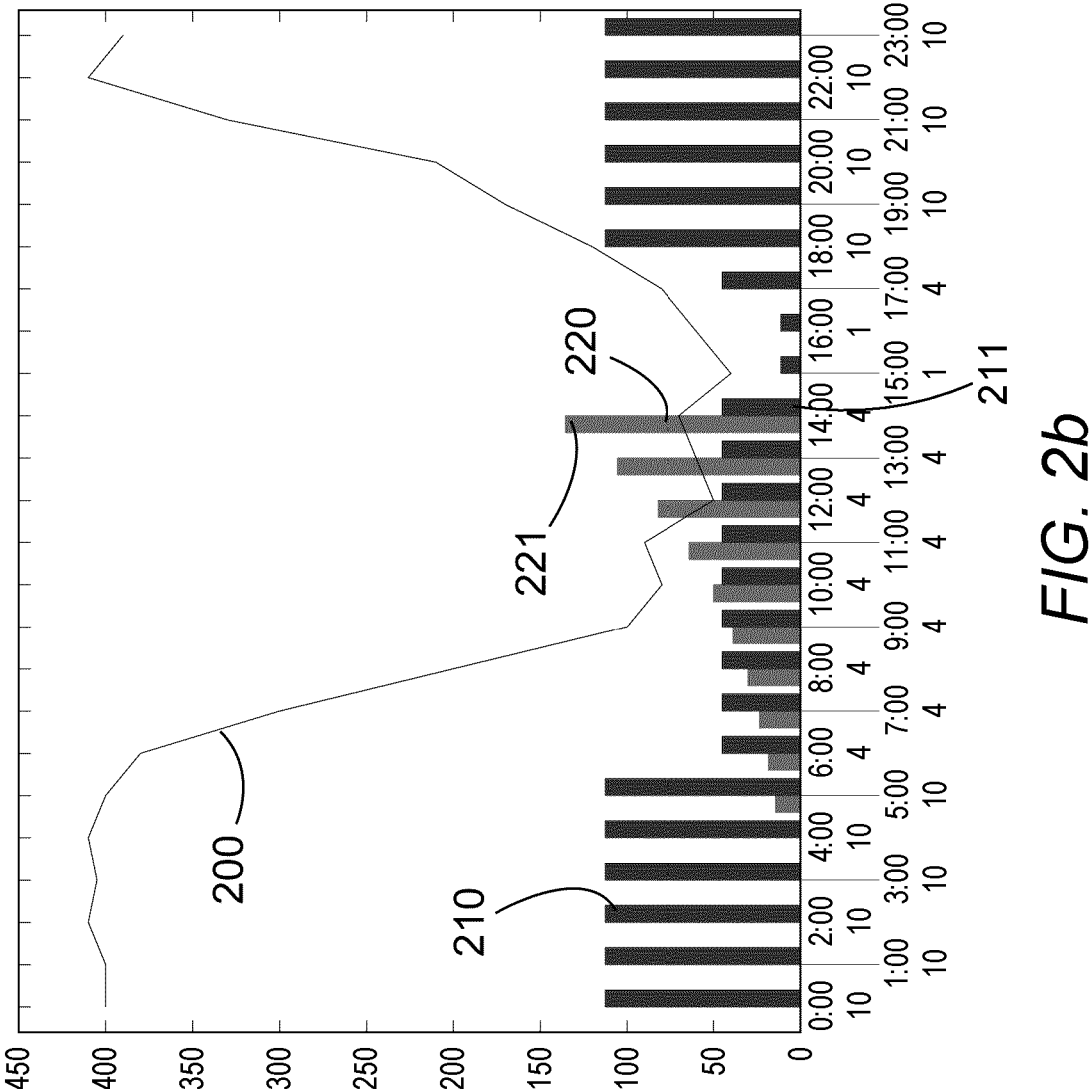
Figure 2C:
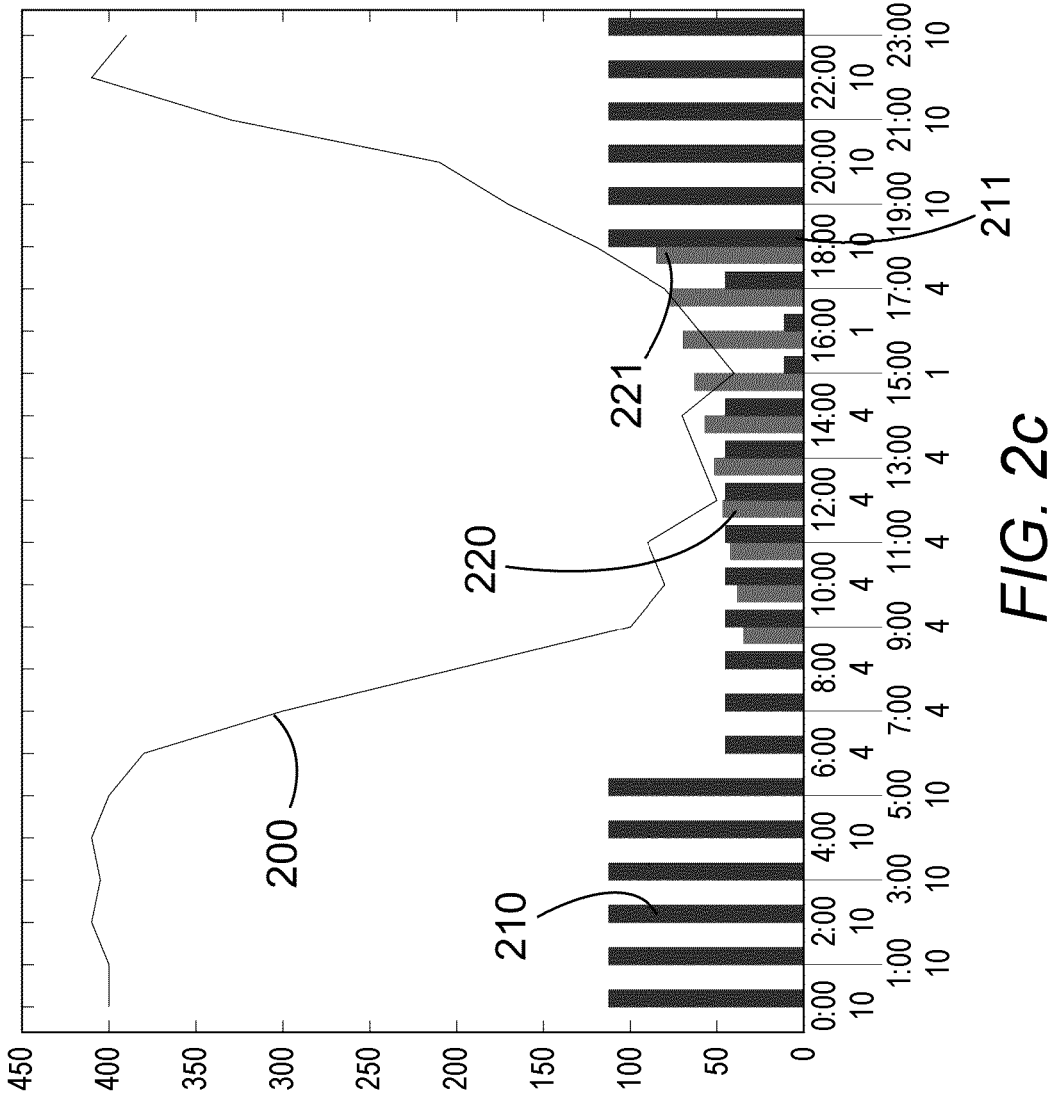

FIGS. 2a, 2b and 2c each show a plot of raw radon data 200. The same raw radon data 200 is shown in each graph. Each of FIGS. 2a, 2b and 2c also shows a set of bars 210 indicating the ventilation time constant at various time points throughout the day (one value for each hour). The ventilation time constants 210 are also the same on each graph and show how the ventilation rate varies throughout the day. The ventilation rate is low (high time constant) from midnight through to 5 am, indicating a night time level of ventilation. At 6 am the ventilation rate increases as fans switch on (time constant reduces) to provide a day time ventilation rate. At 3 pm the ventilation rate increases again as the fan engages a boost mode (time constant reduces again). At 5 pm, the ventilation rate decreases back to the normal day time level (time constant increases) and at 6 pm, the ventilation rate decreases (time constant increases) again back to the night time level.

Also shown in each of FIGS. 2a, 2b and 2c is a set of weights 220 that show how a weighted average is calculated for a particular time point based on the raw radon data 200 and the ventilation time constant 210.

FIG. 2a shows the weights 220 for the time 16:00. At this time the fan is in boost mode and the ventilation time constant is at its lowest level (having a value of 1 hour). This indicates that radon is being removed from the room very efficiently and so it is desirable to weight the most recent measurements strongly and to lower the weight for the older measurements. Accordingly, the weights 220 form an exponential curve with the maximum weight 221 at the time of the current measurement (16:00) and with the time constant of the exponential curve based on the time constant 211 for the current measurement (16:00). The time constant at 16:00 has the value '1' (as shown on the horizontal axis below the time value), resulting in an exponential curve with a steep (fast) rate of decay. For example, as can be seen in FIG. 2a, the weight for the radon measurement one hour previously (15:00) is already almost a third of that for the current measurement (16:00) (in fact it is reduced by a factor 1/e as the time constant is 1 hour and the weight is being calculated for a time 1 hour earlier than the current measurement) and the weights have decreased to a negligible value for any data more than about 4 hours earlier. This weights the average very strongly towards the most recent data.

Generally, for a series of radon measurements $x_i$, taken at times $t_i$, the value for the weighted average $a_i=a(t_i)$ can be calculated by first calculating a series of weights $w_j$ based on the time constant $\tau_i$.

$$a_i = a(t_i) = x_i w_i + x_{i-1} w_{i-1} + x_{i-2} w_{i-2} + \dots = \sum_{n=0}^{N} x_{i-n} w_{i-n}$$

Where the weights are calculated:

$$w_{i-n} = A e^{-\frac{t_i - t_{i-n}}{\tau_i}}$$

A is a normalising factor that can be calculated to ensure that the weights all sum to one.

Comparing FIG. 2b to FIG. 2a, the weights for an earlier time, 14:00, are shown, i.e. the weights used to calculate the weighted average for 14:00. At 14:00, the time constant has the value '4' instead of '1' and therefore the exponential curve for the weights in FIG. 2b is much less steep. In FIG. 2b, the weight for the measurement one hour previously (i.e. at 13:00) is still almost 80% of the weight for the current time (14:00) and the weight has only reduced to a third (more precisely 1/e) for the measurement four hours previously (10:00). The weights are still non-negligible at 5:00, i.e. 9 hours before the current time in FIG. 2b. Thus the weighted average for 14:00 is calculated with more weight placed on earlier measurements and is less skewed towards the current measurement (although the highest weight is still given to the most recent data).

FIG. 2c shows another example, this time showing the weights used to calculated the average at 18:00 at which time the time constant has a relatively large value of '10' due to the ventilation having been switched off by that time. As can be seen, the exponential curve is even flatter in FIG. 2c than it is in FIG. 2b. In FIG. 2b, the weight at 17:00, i.e. one hour before the current time of 18:00, is still 90% of the weight for the current time. The weight for the data 9 hours before the current time, i.e. the weight for the data at 9:00, is still 40% of the weight for the current time. Thus, the weighting with the larger time constant takes into account data over a much longer time period prior to the current time.

FIGS. 2a-2c only show weights for a 10 hour period. This is merely one example and it will be appreciated that the average may be taken over any period. For example, a 24 hour average could be formed by creating an exponential series of weights over a 24 hour period.

Figure 3A:
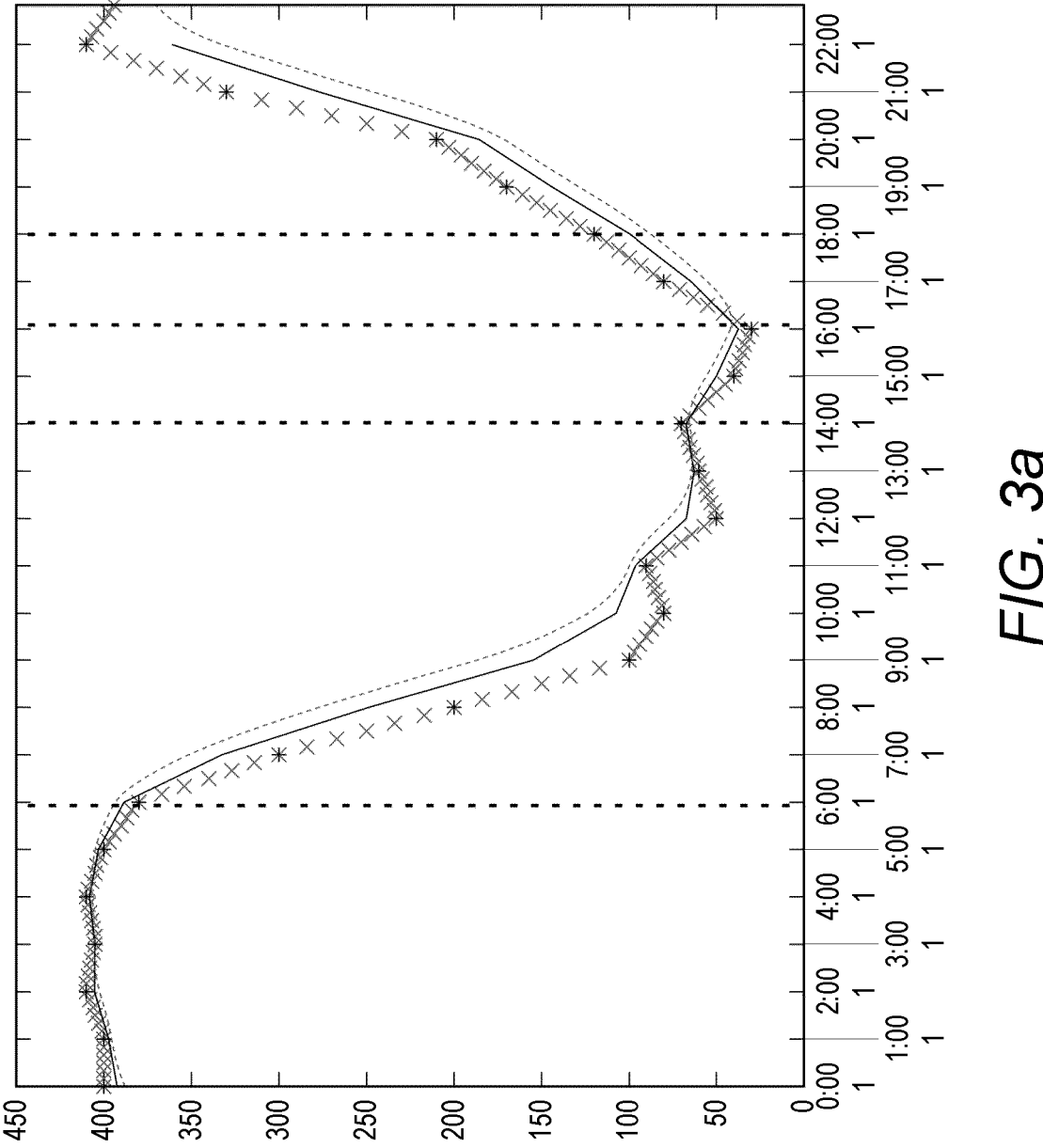
FIGS. 3a-3d show examples of weighted averages with different time constants.
Figure 3B:
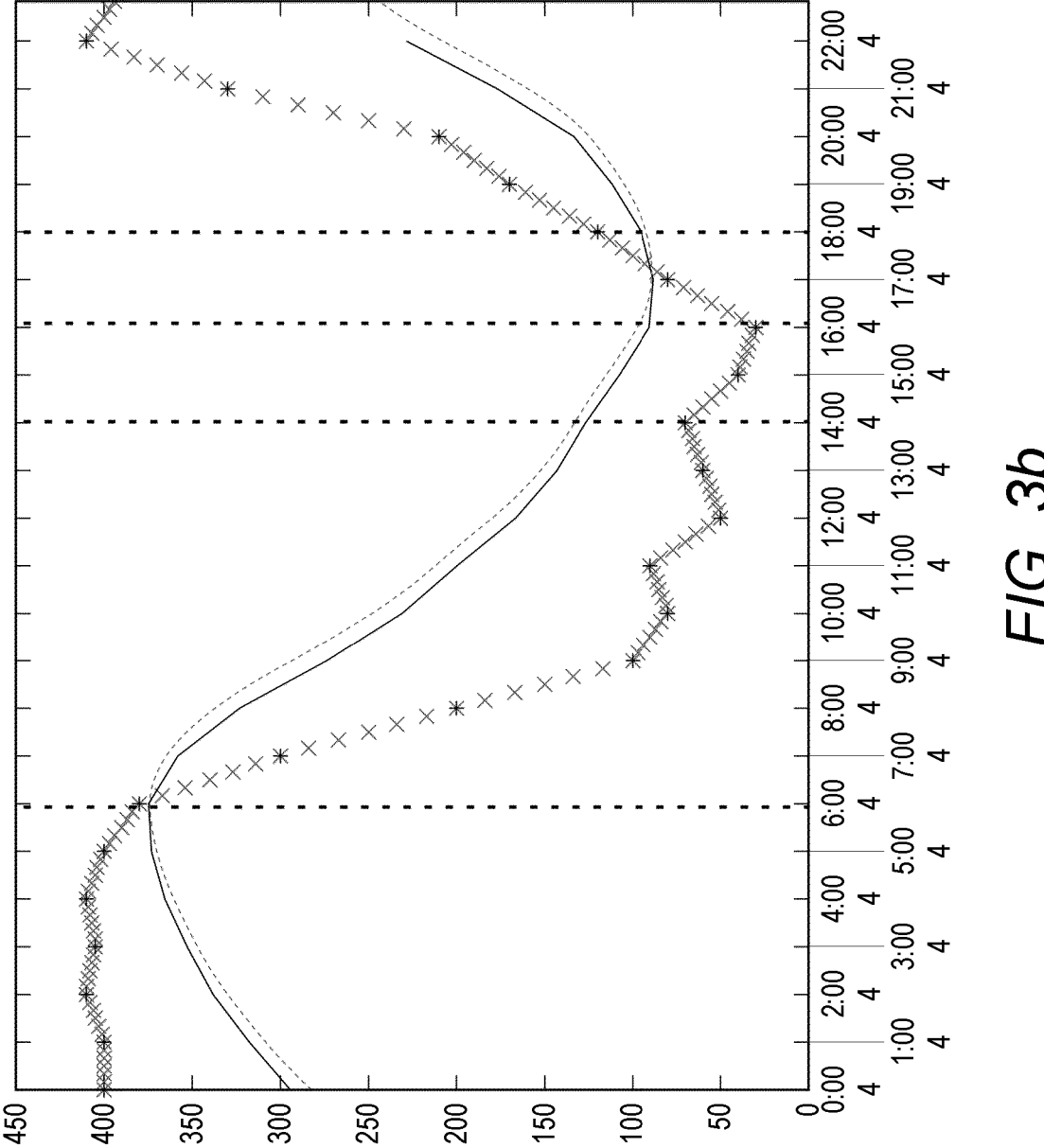
Figure 3C:
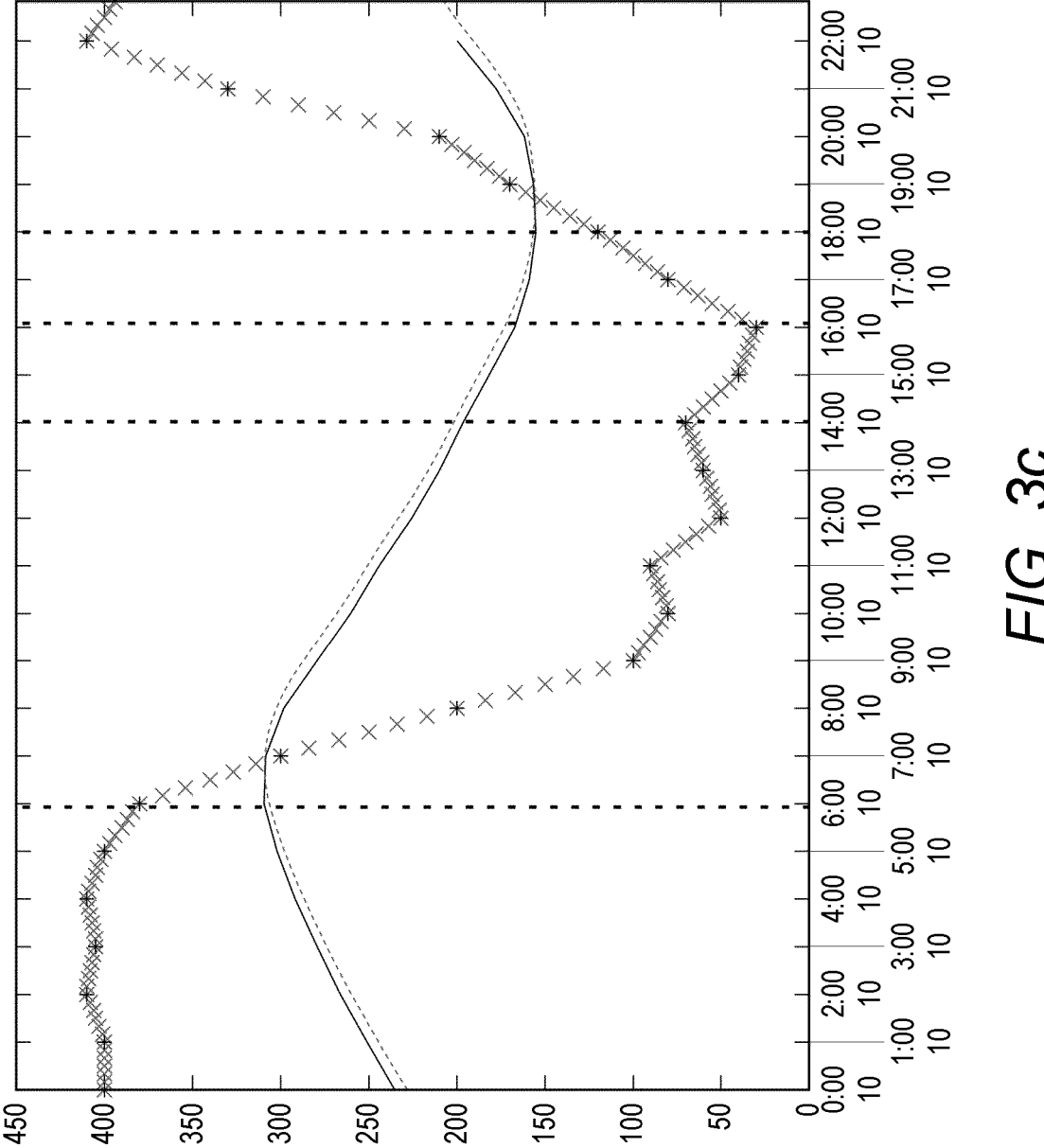

FIGS. 3a-3c show the same raw radon data as is shown in FIGS. 2a-2c, but with a 24-hour moving average illustrated. In FIG. 3a, the weights for the moving average are calculated using a time constant of '1' which is used uniformly throughout the day. FIG. 3b is the same as FIG. 3a except that the time constant of '4' is applied uniformly throughout the day. FIG. 3c is the same again, but with the time constant of '10' applied uniformly throughout the day. As can be seen from these three graphs, the longer time constant smooths the data much more. The average with the time constant of '1' follows the actual raw data very closely, whereas the time constants of '4' and '10' show significant degrees of smoothing. Each graph also shows a lag from the actual data (e.g.

the maxima and minima of the smoothed data occur later in the day than the raw data suggests). This is a property of the smoothing algorithm and can be compensated by time shifting the calculated average appropriately.

Figure 3D:
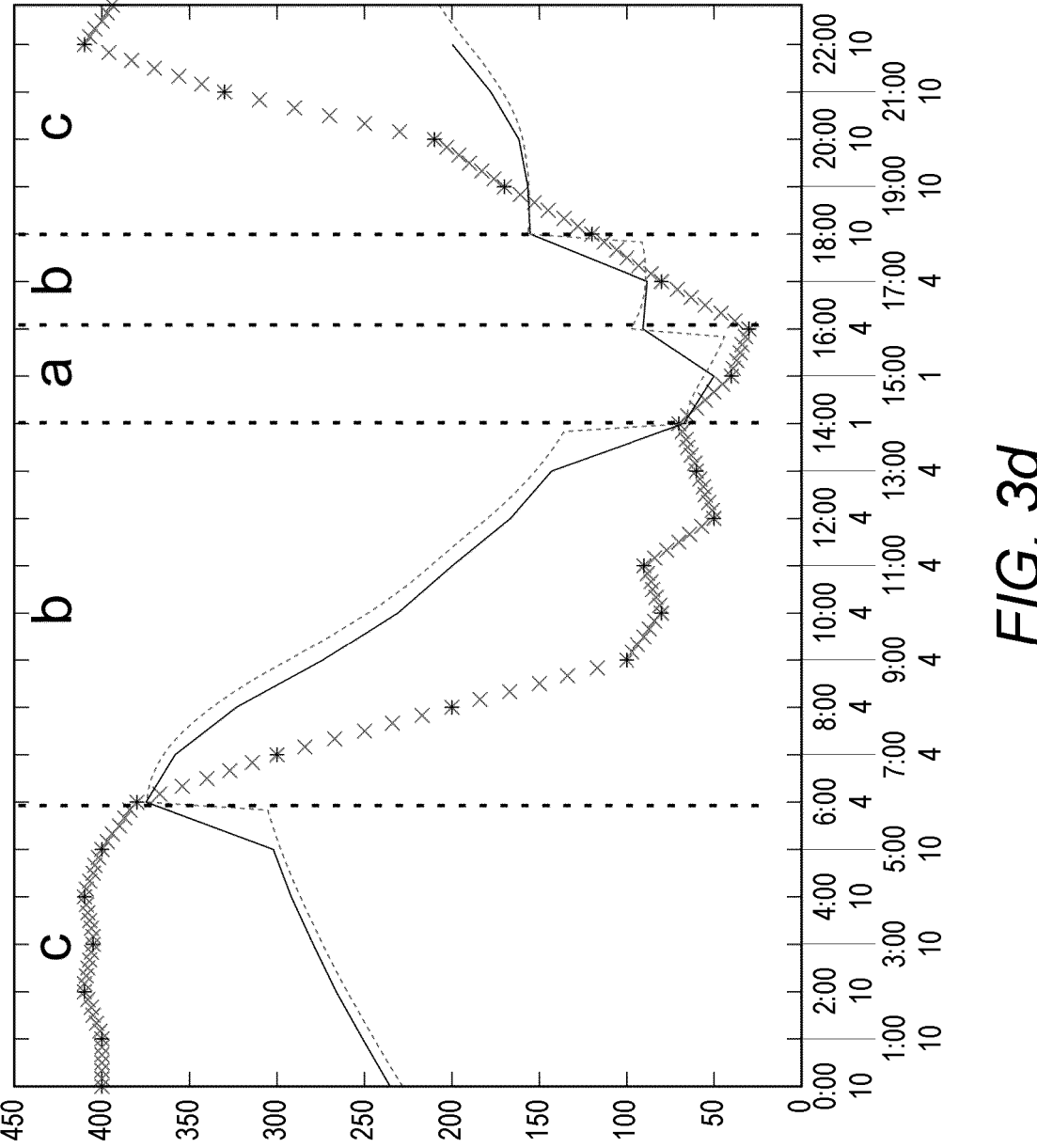

FIG. 3*d* shows an exponential weighted moving average in which the time constant for the weights is changed as the time constant for the ventilation varies throughout the day. As is shown on the horizontal axis at the bottom of the graph, the time constant changes through the day as ventilation is switched on and off or switched into boost mode. This pattern of varying time constants is the same pattern as is illustrated in FIGS. 2*a*-2*c*.

FIG. 3*d* shows that the average jumps in value at various points in the day. These points correspond to the changes in ventilation rate (and therefore changes in time constant) as the weights that are used to calculate the average value change abruptly. The graph is divided into five sections which are separated by vertical dashed lines positioned at these transitions. The first section is from 00:00 up to 06:00 during which time the ventilation is at a low level (night rate) or even off altogether. The time constant for this section is '10'. At 06:00 the ventilation fans start up, or increase ventilation to a day rate, and the ventilation time constant changes from '10' to '4'. The second section is from 06:00 to 14:00 during which time the ventilation time constant remains at '4'. At 14:00 the ventilation enters a boost mode and the time constant drops to '1' for the third section, until 16:00. For the fourth section, the ventilation rate returns to the day level at '4' until 18:00. Then for the fifth section from 18:00 onwards, the ventilation time constant returns to '10', i.e. the night ventilation rate. FIG. 3*d* shows that during the day, when the time constant is low, the graph follows the actual data quite closely.

The vertical dashed lines extend upwards through FIGS. 3*a*-3*c* so as to show that the graph of FIG. 3*d* can be constructed in a different way. Each section of FIG. 3*d* corresponds to a section of one of the other graphs from FIGS. 3*a*-3*c* and is labelled accordingly towards the top of FIG. 3*d*, using the labels 'a', 'b' and 'c' to show which Figure they correspond to. Therefore, an alternative way to construct the graph of FIG. 3*d* is to calculate a weighted moving average with a constant (non-time-varying) time constant for each of the time constants that will be used throughout the day. In this case, the weighted moving average is calculated for each of the time constants '1', '4' and '10'. The resulting graphs can then be spliced together, taking the relevant section from the graph for the appropriate time constant.

Each of FIGS. 3*a*-3*d* also shows the use of data interpolation. The raw data that corresponds to the data shown in FIGS. 2*a*-2*c* is shown with a '+' symbol. These data points are only obtained once per hour as the radon sensor only outputs a new value once per hour. This may for example be due to the small size of the sensor (e.g. a small diffusion chamber) and the correspondingly low rate of data acquisition (low numbers of disintegrations per hour). This provides only a small number of data points to work with throughout the day. Therefore, each of FIGS. 3*a*-3*d* also shows interpolated data points, shown with the 'x' symbol. These interpolated data points are generated at 10 minute intervals based on a simple linear interpolation between two adjacent raw measurements. Thus the interpolated measurements lie on a straight line between adjacent raw measurements. It will be appreciated that the interpolation interval can be varied as required. For example it may be useful to match the interpolated radon measurements to the rate at which data is acquired from other sensors (e.g. $CO_2$, VOC, etc.) for convenient processing. FIGS. 3*a*-3*d* also show a weighted moving average calculated using the interpolated measurements so as to provide better resolution in the final data. Each interpolated measurement is still associated with an appropriate weight, calculated according to the exponential formula and corresponding to its own time. Therefore, for a given length of average (e.g. 24 hour average), there are six times as many measurements to combine with the weighted average. The finer time-resolution provided by the interpolation is useful for a number of reasons, including allowing for additional processing tasks such as redistribution of detected alpha-decays from Polonium to correct for the time delay in the decay chain and also allowing more accurate time shifting to compensate for the delay introduced by the weighted averaging process.

Figure 4:
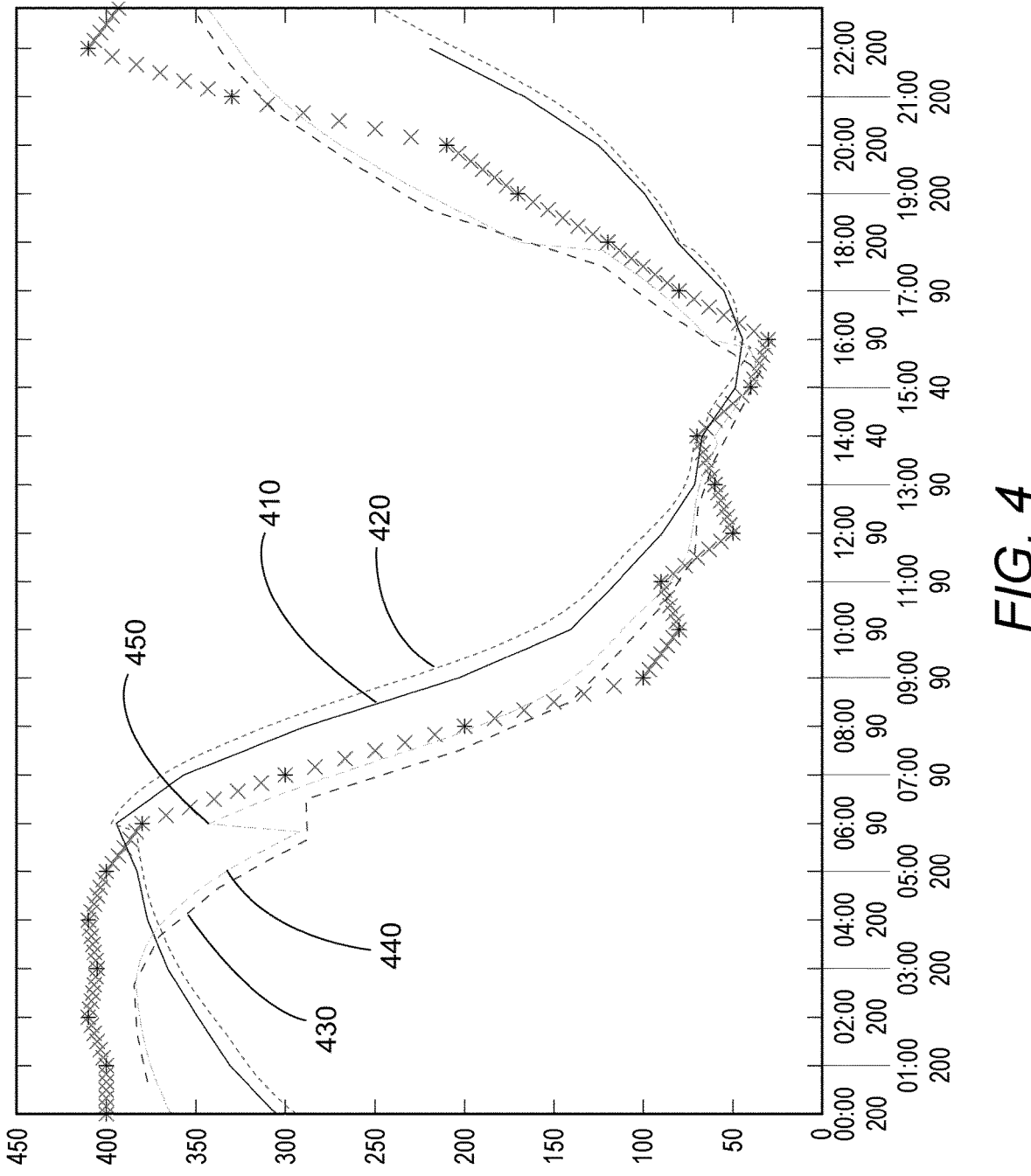
FIG. 4 shows the effect of applying a time shift to weighted averages.

FIG. 4 shows an example of how the data can be time shifted. The data in FIG. 4 is the same as in FIGS. 3*a*-3*d* except that the time constants used in the weighted averages of FIGS. 3*a*-3*d* are quite large so as to emphasize the effect that the different time constants have on the averaging. In FIG. 4 the same data has been processed with smaller time constants. The main effect of this is less smoothing in the low ventilation times during the night. Here the time constants used are 200 minutes (0:00 to 05:00 and 18:00 to 23:00), 90 minutes (06:00 to 13:00 and 16:00 to 17:00) and 40 minutes (14:00 to 15:00). As with FIGS. 3*a* to 3*d*, the raw hourly data is processed on its own and is shown by line 410 and interpolated data is also shown and processed in the same way, shown by dashed line 420. In addition, FIG. 4 also shows a time-shifted hourly line 430 (based on the hourly raw data) and a time-shifted interpolated line 440 (based on the interpolated data). The time shifting in this example is based on the time constant and thus the amount of time shifting varies throughout the day with the varying time constant so as to compensate for the varying degrees of delay caused by the averaging process. The time shifting is performed here by calculating weighted moving averages for each time constant across the data (as described in relation to FIGS. 3*a*-3*c*), then time shifting each of those graphs by the appropriate time constant, then performing the merge according to the varying time constant as described in relation to FIG. 3*d*. It can clearly be seen here that the time-shifting brings the peaks and troughs of lines 430 and 440 closely in line with those of the raw data. In addition, the effect of the interpolation can be seen at 450 on line 440 where the change of ventilation (and corresponding change of time constant) brings the graph 440 closer to the raw data earlier than is possible with the non-interpolated graph 430.

Figure 5:
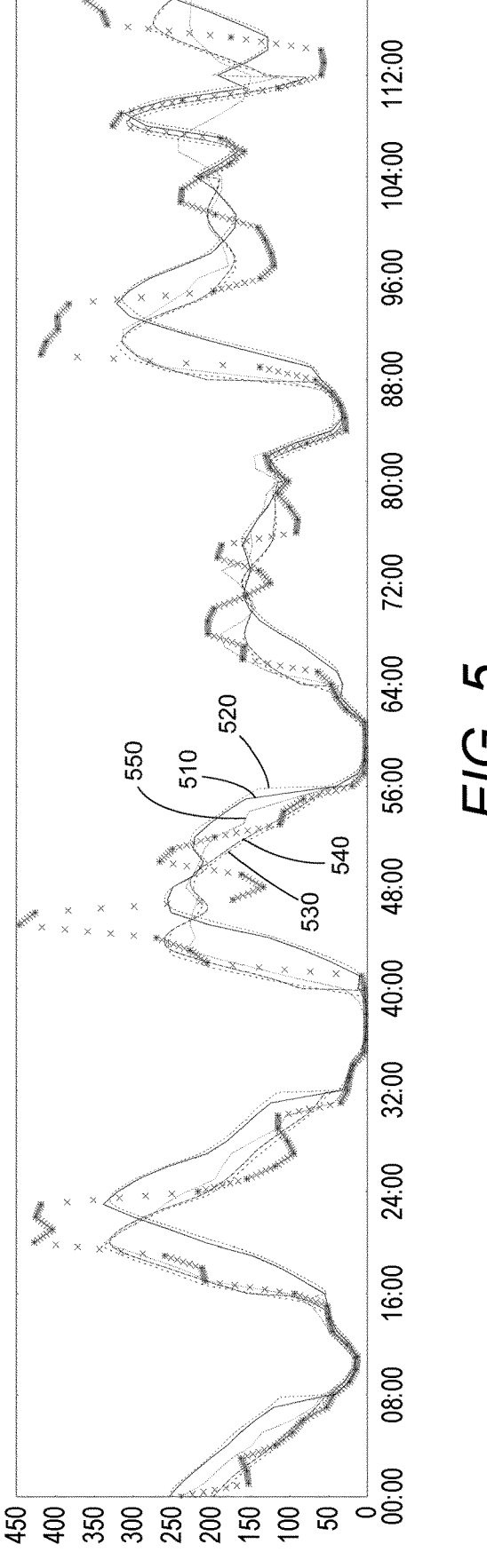
FIG. 5 shows examples of weighted averages calculated over a longer time period.

FIG. 5 shows another example with different data. FIG. 5 shows five days of data rather than a single 24 hour period and the raw data here show larger noise levels and variations, including some unusually high (and possibly unrepresentative) data points during the night periods. The benefits of the smoothing during these periods is more apparent from this data set. As with FIG. 4, the graphs in FIG. 5 include the algorithm applied to the hourly raw data as shown by line 510, the algorithm applied to interpolated data by line 520, the hourly raw data with time-shifting shown by line 530 and the interpolated data with time-shifting shown by line 540. Finally, line 550 shows the output from an alternative algorithm that includes further adjustments such as for the timing of Polonium counts as discussed above.

FIG. 6 shows a flow chart of a method of monitoring radon. At step 610 a series of radon measurements is acquired in an area. The area may be a room for example. At step 620 a characteristic value relating to ventilation in the area is obtained. The characteristic value may for example be a ventilation rate or an exponential time constant relating to ventilation in the room. At step 630 a weighted average is calculated from the series of radon measurements. The weights for the weighted average are calculated based on the characteristic value obtained in step 620.

FIG. 7 shows another flow chart showing a method of monitoring radon. At step 710 a series of radon measurements is acquired in an area. The area may be a room for example. At step 720 interpolation is performed on the series of radon measurements in order to increase the resolution of the data. For example, hourly radon measurements may be interpolated to 5 minute time intervals. Any form of interpolation may be used, but by way of example a linear interpolation between adjacent measurements may be used. In step 730 data is acquired from one or more additional sensors. The additional sensors may include a $CO_2$ sensor, a VOC sensor, a temperature sensor and/or a humidity sensor. At step 740 multiple characteristic values relating to ventilation in the area are obtained from the sensor data. For example, the sensor data may be processed to calculate ventilation rates and/or ventilation time constants at various times throughout the day. For example the levels of VOCs and/or $CO_2$ in a room are affected by the ventilation rate. At step 750 a weighted average for the series of radon measurements is calculated for each characteristic value obtained in step 740. Thus, several weighted averages are obtained, each using weights based on a different characteristic value. The weighted averages obtained this way are moving window weighted averages, i.e. a weighted average value is calculated in each time point throughout the day, each weighted average value being based on a number of preceding radon measurement values, combined according to the calculated weights. Thus each weighted average calculated in step 750 is itself a time series of calculated (averaged) values. In step 760 the weighted average data is time shifted to compensate for the delay that is introduced by the averaging process. The time shift may for example comprise time shifting each weighted average data point earlier in time by one time constant. In step 770 the time shifted weighted averages are merged together according to the time varying characteristic value obtained for the area. Thus, for a given time period associated with a given characteristic value, data is taken from the corresponding time shifted weighted average for that characteristic value.

It will be appreciated that not all steps of FIG. 7 are essential and that the order of the steps does not have to be performed exactly as shown. For example, interpolating the data in step 720 is optional and can be omitted in some examples. Characteristic values for the area could be obtained from sources other than the sensors in steps 730 and 740 (e.g. they could be looked up from previous measurements or they could be provided by a ventilation controller). The time shifting of step 760 is not essential as the delay could be ignored or could be removed or compensated in later processing. The interpolation of step 720 (if used) could be performed after (or in parallel with) one or both of steps 730 and 740.

It will be appreciated that many variations of the above embodiments may be made without departing from the scope of the invention which is defined by the appended claims.

The invention claimed is:

1. A method of monitoring radon in an area, comprising:
    acquiring a series of radon measurements for the area;
    obtaining a first characteristic value relating to a first ventilation in the area;

obtaining a second characteristic value relating to a second ventilation in the area; and
    calculating a first weighted average from the series of radon measurements;
    wherein weights for the first weighted average are calculated based on the first characteristic value; and
    calculating a second weighted average from the series of radon measurements;
    wherein the weights for the second weighted average are calculated based on the second characteristic value.

2. A method as claimed in claim 1, wherein the weights are higher for more recent measurements in the series.

3. A method as claimed in claim 1, wherein the first and/or second characteristic value is a time constant for the change in radon concentration due to the first and/or second ventilation.

4. A method as claimed in claim 3, wherein the time constant is the time constant of an exponential decay curve.

5. A method as claimed in claim 1, wherein the weights form an exponential curve with time constant based on the first and/or second characteristic value.

6. A method as claimed in claim 5, wherein the weight for a given measurement is determined based on the exponential decay curve, the time constant and the time that has elapsed since the given measurement.

7. A method as claimed in claim 1, wherein the series of radon measurements is a moving window of measurements over time.

8. A method as claimed in claim 1, wherein:
    when a new radon measurement is acquired, a new first and/or second characteristic value relating to first and/or second ventilation is acquired and the weights are updated based on the new first and/or second characteristic value.

9. A method as claimed in claim 1, wherein the first and/or second weighted average is an exponentially weighted moving average.

10. A method as claimed in claim 1, wherein the first and/or second characteristic value relating to first and/or second ventilation in the area is obtained from measurements of an air quality characteristic, such as at least one of: carbon dioxide, volatile organic compounds and humidity in the area.

11. A method as claimed in claim 1, wherein the first and/or second characteristic value relating to first and/or second ventilation in the area is obtained from a lookup table based on the current time.

12. A method as claimed in claim 1 comprising:
    increasing the time resolution of the series of radon measurement values by interpolating to calculate interpolated measurements between actual measurements.

13. A method as claimed in claim 12, wherein the interpolating is linear interpolating between adjacent measurements.

14. A method as claimed in claim 1, further comprising:
    forming a combined time series of radon values comprising a plurality of time points and a corresponding plurality of radon values, wherein the radon values for a first set of time points are calculated from the first weighted average and a second set of time points are calculated from the second weighted average.

15. A method as claimed in claim 14, wherein the first set of time points correspond to times when the ventilation in the area had the first characteristic value and the second set of time points correspond to times when the ventilation in the area had the second characteristic value.

16. A method as claimed in claim 14, wherein the first set of time points and the second set of time points are determined by applying a low pass filter to the radon measurements to determine times at which the radon level was rising and times at which the radon level was falling; and determining the first set of time points as the time points at which the radon level was rising and the second set of time points as the time points at which the radon level was falling.

17. A method as claimed in claim 1, wherein the area is a room.

18. A radon measurement system comprising:

a radon detector arranged to acquire a time series of radon measurements; and a processor arranged to:

obtain a first characteristic value relating to a first ventilation in the area in which the radon detector is located;

obtain a second characteristic value relating to a second ventilation in the area in which the radon detector is located;

calculate a first weighted average from the series of radon measurements;

wherein weights for the first weighted average are calculated based on the first characteristic value; and calculate a second weighted average from the series of radon measurements;

wherein weights for the second weighted average are calculated based on the second characteristic value.

19. A radon measurement system as claimed in claim 18, further comprising:

a sensor arranged to measure an air quality characteristic over time; and wherein the radon measurement system is arranged to determine the first and/or second characteristic value from the measured air quality characteristic.

\* \* \* \* \*